M. WALKER.
DYNAMO ELECTRIC MACHINE.
APPLICATION FILED NOV. 30, 1910.
1,036,757.
Patented Aug. 27, 1912.
Fig. 1.
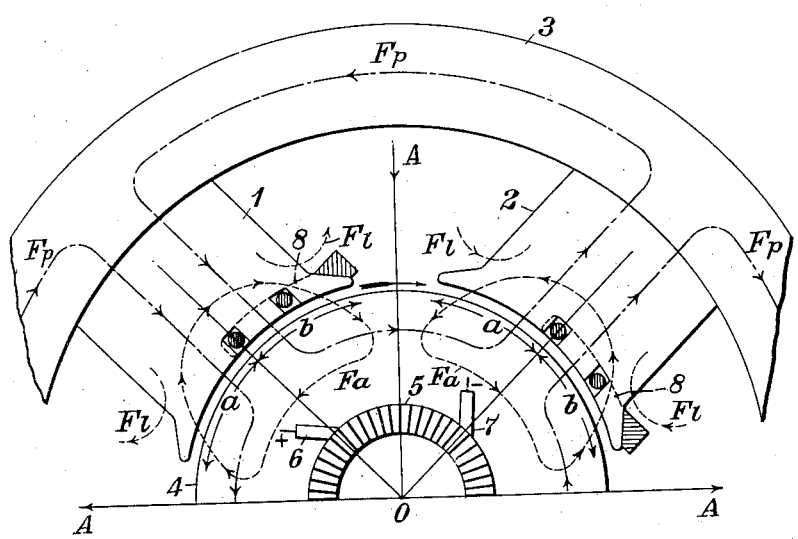
Fig. 2.
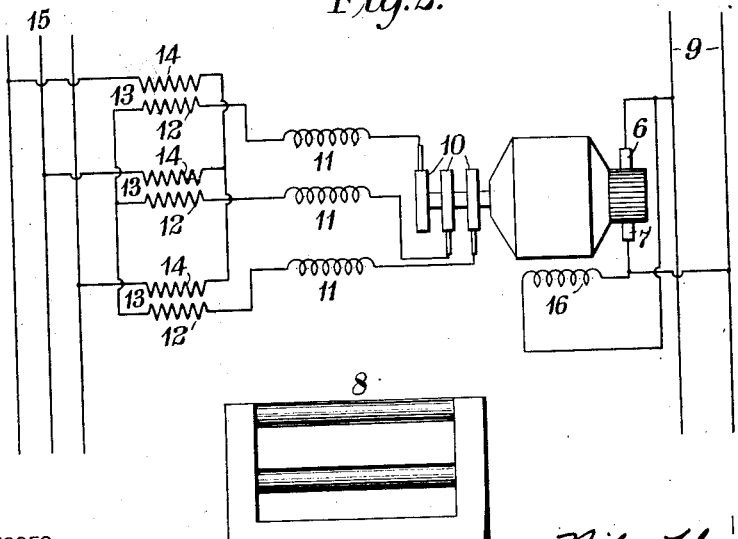
Fig. 3.
WITNESSES:
C. L. Belcher
B. B. Hines
INVENTOR
Miles Walker
BY
Wiley G. Carr
ATTORNEY

UNITED STATES PATENT OFFICE.

MILES WALKER, OF HALE, ENGLAND, ASSIGNOR TO WESTINGHOUSE ELECTRIC AND MANUFACTURING COMPANY, A CORPORATION OF PENNSYLVANIA.

DYNAMO-ELECTRIC MACHINE.

1,036,757.  Specification of Letters Patent.  Patented Aug. 27, 1912.

Application filed November 30, 1910. Serial No. 594,993.

*To all whom it may concern:*

Be it known that I, MILES WALKER, a subject of the King of Great Britain, and a resident of Hale, in the county of Chester, England, have invented a new and useful Improvement in Dynamo-Electric Machines, of which the following is a specification.

My invention relates to that type of dynamo-electric machine known as rotary converters, and it has for its object to provide machines of this type which will withstand excessive overloads without arcing between the positive and negative brushes.

When a dynamo-electric machine is loaded as a direct current generator, the armature current produces a cross magnetic field which tends to weaken the flux at the edge of the pole under which an armature coil first moves when it reaches the pole (called hereinafter the "front" edge) and to strengthen the flux at the edge under which the coil last moves as it leaves the pole (called hereinafter the "rear" edge). If the iron of the rear edge and that of the armature teeth under it are magnetically saturated, no great increase of flux therethrough results, while a decrease in the flux through the front edge is effected. The total flux through the whole pole face is thus decreased, with a consequent reduction in the voltage generated. When a direct current generator is short-circuited, this weakening of the field causes a drop in the voltage, and the current does not rise to as high a value as it otherwise would. This effect is of considerable assistance in avoiding a "flash-over" from one brush-holder arm to another when a direct current generator is short-circuited. In the case of rotary converters, however, the reduction in the voltage between the brushes due to the distortion of the flux in the poles is considerably less, since the cross-field which would be produced by the direct current is to some extent compensated for by the alternating current. Machines of this description are moreover generally provided with "damping" grids or rings surrounding their pole pieces for the purpose of preventing sudden distortion or variation of the flux therein, and, consequently, the desired reduction in the total field flux described above on short-circuit will not occur, even if for a moment the armature is acting as a direct current generator without compensation. Furthermore, if the direct current brushes of a rotary converter are short-circuited when the machine is running, the consequent reduction in the voltage at the alternating current terminals of the machine, caused by the impedance of the alternating current circuit, is not of material assistance in preventing an abnormal current flow through the direct current circuit of the rotary converter, since the kinetic energy of the rotor of the machine supplies energy to keep the machine running as a direct current generator for a short interval of time. The machine then tends to get out of step, on account of the heavy retarding torque of the direct current circuit of the rotary converter operating as a braking generator.

According to the present invention, the above disadvantages are obviated by providing some or all of the field poles of the rotary converter with rings or grids of conducting material which surround the "rear" portions of the pole faces but do not surround the front portions thereof. A rotary converter thus constructed may or may not be also provided with a considerable amount of inductance in its alternating current circuit which operates in conjunction with the particular arrangement of the pole damping rings to insure both the protection of the alternating current and direct current circuits of the machine, as will be hereinafter explained.

In the accompanying drawings, Figure 1 is a diagrammatic view, in side elevation, of a portion of a rotary converter, the pole pieces of which are provided with damping grids or rings arranged in accordance with the present invention. Fig. 2 is a diagrammatic view showing the connections of the machine to the alternating and direct current circuits. Fig. 3 is a plan view of one of the grids shown in Fig. 1.

Referring now to Fig. 1, two of the polar projections of the rotary converter are indicated at 1 and 2 as connected to a common yoke or frame 3. The armature and commutator of the machine are indicated diagrammatically at 4 and 5, respectively, a positive commutator brush 6 and a negative commutator brush 7 being also shown in the figure. The path of the magnetic fluxes produced by the field windings (not shown) of the machine are indicated at $F_p$, the polar projection 1 being of north polarity and the polar projection 2 of south polarity. The axes of the cross-magnetic fields produced by the current in the armature windings are indicated at O A, and the paths of the fluxes constituting the said cross-magnetic fields are shown at $F_a$. Each of the faces of the polar projections 1, 2, is provided with a short circuited ring or grid 8 of any usual form and of conducting material which surrounds that portion of each pole face under which a point in the armature 4 last moves when it leaves the pole, each pole face being thus divided into two portions, viz:—the portion indicated at $a$ which is not surrounded by the grid 8 and the portion $b$ which is surrounded by the said grid.

The operation of the apparatus is as follows: When the rotary converter is running under normal conditions, the cross-magnetization which would be produced by the direct current in the armature is neutralized by the alternating current supplied thereto, but if, owing to a short-circuit or a sudden decrease in the resistance of the external direct current circuit, the machine delivers a larger direct current than can be neutralized by the alternating current, a magneto-motive force is set up along the paths $F_a$. This magneto-motive force tends to strengthen the flux through the portion $b$ of the pole face and to weaken the flux through the portion $a$. The conducting grid or ring 8, according to a well known manner of operation, serves to retard the rise in flux through the portion $b$ of the pole face which it surrounds. There being nothing to oppose the change in the magnetization of the portion $a$ of the pole face, the flux through this portion is reduced under the influence of the armature reaction, or, if the short-circuit be of sufficiently low resistance, it may be completely neutralized or even reversed in polarity. A portion of the flux from the main pole, under these circumstances, leaks along lateral paths such as $F_1$ when the said portion of the flux comes under the influence of the strong demagnetizing force of the armature current. The voltage generated at the direct current brushes is thus very considerably reduced when a short-circuit occurs and the current does not rise to as high a value as it otherwise would.

As explained above, the large current due to a short-circuit on the direct current side of the rotary converter exerts a large retarding torque on the rotor of the machine which therefore tends to get out of step. This tendency is to a great extent avoided by the use of the grids 8, since, not only is the current traversing the short-circuit reduced by their agency, in the manner explained above but, if the short-circuit is still large enough to effect a reversal of the polarity of the portions $a$ of the pole faces of the machine, there will be no great turning movement tending to stop the rotor, since the portions $a$ and $b$ of the pole face oppose one another in their magnetic effect.

Referring now to Fig. 2, a rotary converter constructed in accordance with Fig. 1 is shown as having its direct current brushes 6 and 7 connected to a direct current distribution circuit 9, the alternating current slip-rings 10 of the machine being connected through inductances 11 to the secondary windings 12 of transformers 13 the primary windings 14 of which are connected to the conductors of a three-phase alternating current supply circuit 15. The rotary converter, which is indicated as provided with the usual field winding 16, is thus protected on both its alternating and its direct current sides, since the inductances 11 serve to limit the maximum current passing through the slip-rings 10 while the direct current side of the apparatus is protected by the use of the grids 8 shown in Fig. 1. It will be understood that the capacity of the grids or rings 8 may readily be arranged to be sufficient to act as effective "amortisseurs" or dampers in a well-known manner.

I have thought it unnecessary to describe any specific form of grid or short-circuited coil as the construction of these devices is well known in the art and any suitable design may be adopted.

I claim as my invention:

1. A rotary converter having a field magnet pole piece provided with a low-resistance member of conducting material surrounding that portion only of the pole face through which the flux is increased by armature reaction so that the flux in the unsurrounded portion may be rapidly varied for the purpose specified.

2. A rotary converter the alternating current circuit of which is provided with such an amount of inductance as will prevent the current therein rising beyond a predetermined amount when a short-circuit occurs in the direct current circuit and having its pole pieces provided with low-resistance windings closed upon themselves around the rear edge portions only thereof, substantially as and for the purpose specified.

3. A rotary converter the polar projections of which are provided with low-resistance members of conducting material around the rear edge portions only thereof.

In testimony whereof, I have hereunto subscribed my name this tenth day of November 1910.

MILES WALKER.

Witnesses:
F. W. Le Fall,
A. S. Cachenaille.